Jan. 17, 1928.

Re. 16,851

H. D. JAMES

SWITCH

Original Filed Feb. 20, 1920

INVENTOR

Henry D. James.

BY

Cherley & Barr

ATTORNEY

Reissued Jan. 17, 1928.

Re. 16,851

UNITED STATES PATENT OFFICE.

HENRY D. JAMES, OF EDGEWOOD, PENNSYLVANIA, ASSIGNOR TO WESTINGHOUSE ELECTRIC & MANUFACTURING COMPANY, A CORPORATION OF PENNSYLVANIA.

SWITCH.

Original No. 1,622,649, dated March 29, 1927, Serial No. 360,115, filed February 20, 1920. Application for reissue filed June 29, 1927. Serial No. 202,420.

My invention relates to switches and it has particular relation to electromagnetically operable switches of the so-called "lockout" type which close only when the current traversing a selected circuit is below a predetermined value.

The object of my invention is to provide a switch of the character indicated above in which the effectiveness of the means for actuating the switch to its closed position shall be increased during the closing movement.

In the operation of electromagnetically operable switches in which opposing forces are exerted upon the movable members, the force tending to close a switch at the instant of the predominance of that force is only slightly greater than the opposing force, since the closing movement is initiated at that instant. It is obvious, therefore, that the closing movement is effected while the resultant force exerted upon the movable element of the switch is materially less than the normal force exerted by the closing means. It occurs frequently that such switches close slowly and that the contact members do not make firm engagement.

In a switch constructed in accordance with my invention, the closing movement of the switch occurs when the force tending to close the switch predominates over the opposing force. During the closing movement, or substantially concurrently with the engagement of the contact members, an air gap between two relatively movable members of the switch is decreased to correspondingly decrease the reluctance of the magnetic circuit for effecting the closing of the switch. The effectiveness of the force exerted by the actuating coil of the switch is thereby materially increased prior to or concurrently with the actual engagement of the contact members. This arrangement effects a more positive operation of the switch and the result is to prolong the life of the coacting contact members by reason of their firm engagement.

In the accompanying drawing, Fig. 1 is a side view, partially in elevation and partially in section of a switch embodying my invention;

Figure 1:
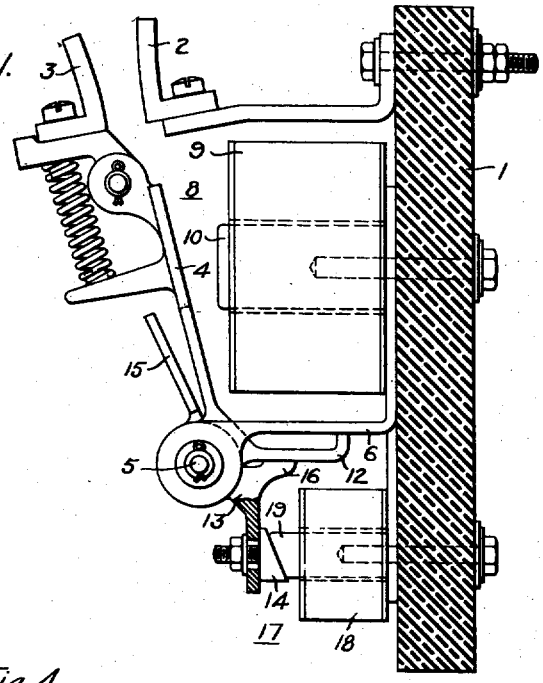
Figure 2:
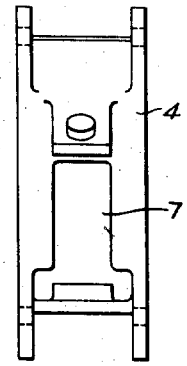
Figs. 2 and 3 are views of details.
Figure 3:
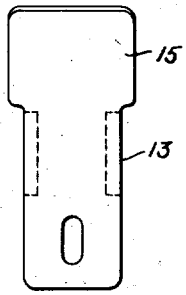

Referring to Figs. 1, 2 and 3, the base plate 1 of suitable insulating material supports a stationary contact member 2. A movable contact member 3 is pivotally supported by and yieldingly connected to a movable arm 4 that is, in turn, pivotally supported at 5 by a stationary member 6. As best shown in Fig. 2, the arm 4 is provided with an opening 7 which materially reduces the cross-sectional area of the arm and correspondingly increases the reluctance of a magnetic circuit comprising this member. The movable arm 4 constitutes an armature member for an electromagnet 8 comprising a shunt-connected coil 9 and a core member 10. The armature member 4 is provided with an extended portion 12 or tail piece of non-magnetic material which engages the member 6 to limit the outward movement of the member 4.

A member 13, the details of which are shown in Fig. 3, and which is pivotally supported at 5, is provided with an armature member 14 that is adjustably connected thereto. The member 13 is provided with an arm 15 which coacts with the arm 4 to bridge the opening 7 under conditions to be later described. The member 13 is provided, also, with an arm 16 which coacts with the extension 12 of the armature member 4 to limit the relative movements of the arms 4 and 13. The armature member 14 and its connected parts are controlled by an electromagnet 17 which comprises a coil 18 and a core member 19. The coil 18 is so connected that it has series characteristics, that is, it is responsive to the values of the current traversing the motor circuit.

The switch is normally in its open position. The coil 9, which may be termed the "closing" coil is energized to a substantially constant degree and the electromagnet 8 tends to effect the engagement of the relatively movable contact members 2 and 3. The coil 18, or "lockout" coil is connected either in series with the motor or in shunt relation to a portion of the starting resistor in such manner as to be energized in accordance with the value of the current travering the motor circuit. The force exerted by the electromagnet 17 tending to retain the switch in its open position varies, therefore, in accordance with the value of the current traversing the motor circuit. As is well known, the value of the current decreases with the acceleration of the motor, other conditions remaining the same.

It may be assumed that the respective coils of the switch are electrically connected in the manner described above. It may be assumed, further, that the switch is in its open position. The electromagnet 8 exerts a substantially constant force tending to move the armature member 4 to its closed position. The main magnetic circuit of the electromagnet 8 comprises the core member 10, armature member 4, and supporting member 6. As previously stated in connection with the description of the structural details of the switch, the armature member 4 is of restricted cross-sectional area and the reluctance of the main magnetic circuit is accordingly relatively high.

A leakage path for the flux of the electromagnet 8 includes the armature member 4, the air gap between the armature member 4 and the arm 15, the arm 15, and supporting member 6. The flux traversing the leakage path tends to close the air gap between the armature member 4 and the arm 15 but such tendency is opposed by the force of the electromagnet 17.

When the value of the current traversing the series coil 18 falls to such value that the force exerted by the electromagnet 8 predominates over that of the electromagnet 17, the armature member 4 is actuated toward its closed position by a relatively weak force since, at the initiation of such movement, the opposing forces are nearly balanced. The closing force increases, however, by reason of the decreasing length of the air gap between the core member 10 and the armature member 4, while the force exerted by the lockout electromagnet decreases by reason of the increasing length of the corresponding air gap.

The approach of the movable member 4 to the core member 8 causes an increased flux to traverse the leakage path including the arm 15. An increased force accordingly tends to effect relative movement of the arm 15 and armature member 4 to close the air gap between them. Prior to, or substantially concurrent with, the engagement of the contact members 2 and 3 and the actuation of the movable member 4 to its closed position, the arm 15 is actuated into engagement with the armature member 4 and the opening 7 is bridged by the arm 15 to materially decrease the reluctance of the main magnetic circuit and thereby insure that the armature member 4 is held in its closed position by a force that is materially stronger than that exerted upon it during its closing movement. The closing force is also increased to a certain degree by reason of the fact that the relative movement of the armature member 4 and arm 15 operates to increase the air gap between the armature member 14 and the core member 19, thereby decreasing the opposing force of the electromagnet 17.

It will be readily appreciated that the arrangement whereby the pull of the closing electromagnet is materially increased at the instant of engagement of the contact members has the imporant advantage of effecting their firm engagement and insuring that the movable elements of the switch shall remain in their respective closed positions. The life of the contact members is increased since this arrangement removes the possibility of the separation of the contact members because of the recoil resulting from the impact of their engagement and eliminates the arcing which may result from such separation.

Figure 4:
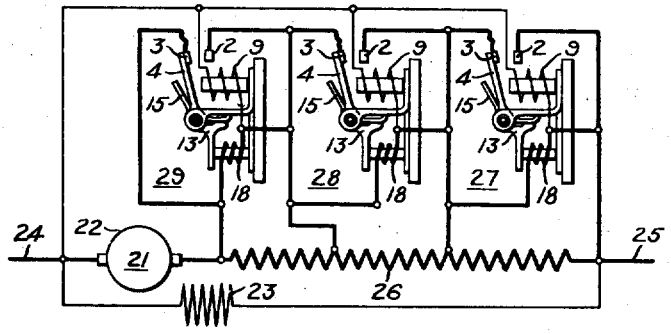
Figs. 4 and 5 are diagrammatic views of circuits and apparatus embodying a plurality of switches of the types shown in Fig. 1.

Reference may now be had to Fig. 4 in which is illustrated a system embodying an electric motor and a plurality of switches constructed in accordance with my invention. An electric motor 21 having an armature 22 and a shunt field-magnet winding 23 is supplied with energy from line conductors 24 and 25. A sectional starting resistor 26 is controlled by a series of successively operable switches 27, 28 and 29 of the lockout type such as are shown in Figs. 1, 2 and 3 and as have been described in detail above. Similar numerals are employed to designate parts corresponding to those of the switch of Fig. 1.

Upon the closing of the motor circuit by any suitable means (not shown) a relatively heavy current traverses the main circuit including the resistor 26. The shunt closing coil 9 of the switch 27, which is connected across the line, is subjected to line voltage. It will be noted, however, that the closing coils 9 of switches 28 and 29 have one terminal connected to intermediate points of the starting resistor 26 and the applied voltage is accordingly less than line voltage. This arrangement insures that the switches operate in the desired sequence. The series lockout coils of each of the several switches are connected in shunt relation to that section of the resistor 26 that is controlled by the switch 29 and they are accordingly energized in accordance with the value of the current traversing the motor circuit as measured by the drop in potential across the resistor section.

When the current falls to the predetermined value at which the switch 27 is adapted to operate, the armature member 4 and the arm 15 are moved toward their closed positions as described above in connection with the switch of Fig. 1. The engagement of contact members 2 and 3 closes a shunt circuit for the corresponding section of the starting resistor 26.

The shunting of the resistor section operates to connect the closing coil 9 of switch 28 directly across the line and thereby subject it to full line voltage. When the rush of current incident to the closing of switch 27 decreases to the predetermined value, the switch 28 closes in the manner described in connection with switch 27.

The closing of switch 28 and the shunting of the corresponding resistor section operates to apply full line voltage to the closing coil 9 of switch 29 and the latter switch closes when the current traversing the motor circuit falls again to the predetermined value. The shunting of the final section of the starting resistor 26 effects the deenergization of all of the lockout coils 18 and the respective closing coils are, therefore, entirely unopposed with the exception of the force of gravity tending to open the switches.

Figure 5:
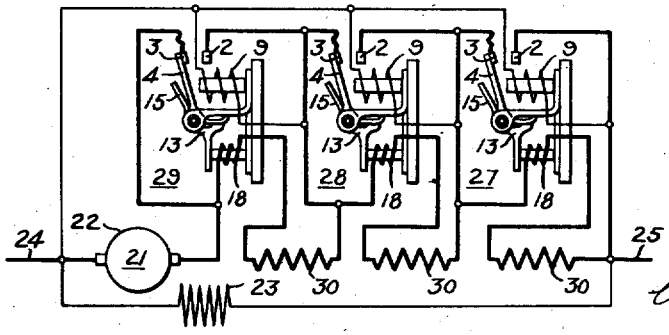

The system illustrated in Fig. 5 differs from that of Fig. 4 in that the series lockout coils are respectively connected in series with the several resistor sections 30 and the armature of the motor. The shunt closing coils are connected by an arrangement that is the equivalent of that of the system of Fig. 4. The operation of the system differs in no material respect from that of the system of Fig. 4 and a detailed description is omitted as being unnecessary to a complete understanding of this portion of my invention.

The many advantages of lockout switches constructed in accordance with my invention, certain of which have been previously fully set forth, will be appreciated by those skilled in the art to which my invention appertains.

I claim as my invention:

1. The combination with a pair of relatively movable coacting contact members, of a movable magnetizable member operatively connected to one of the contact members, a winding adapted to normally exert a closing force on the magnetizable member, a second magnetizable member connected to the first named magnetizable member and movable relatively thereto, a winding adapted to normally exert a force on the second magnetizable member to restrain both members, and means automatically movable to reduce the reluctance of the magnetic circuit through the first named magnetizable member when the magnetic force exerted thereon exceeds the magnetic force exerted upon the said second magnetizable member.

2. The combination with a pair of relatively movable coacting contact members, of a movable magnetizable member operatively connected to one of the contact members, a winding adapted to normally exert a closing force on the magnetizable member, a second magnetizable member connected to the first named magnetizable member and movable relatively thereto, a winding adapted to normally exert a force on the second magnetizable member in opposition to force exerted thereon through the first magnetizable member, and means controlled by the second named magnetizable member for reducing the reluctance of the magnetic circuit through the first named magnetizable member when the magnetic force exerted thereon exceeds the magnetic force exerted upon said second magnetizable member.

3. The combination with a pair of coacting contact members and a movable member operatively connected to one of said contact members, said member having a magnetizable portion of restricted cross-sectional area, of a second movable member having a magnetizable portion adapted to coact with the other magnetizable portion, electromagnetic means for actuating the first movable member, and electromagnetic means operable, when energized above a predetermined degree, to maintain the separation of said magnetizable portions.

4. The combination with a pair of coacting contact members and a movable member operatively connected to one of said contact members, said member having a magnetizable portion of restricted cross-sectional area, of a second movable member having a magnetizable portion adapted to coact with the other magnetizable portion, electromagnetic means for actuating the first movable member, and electromagnetic means operable when energized above a predetermined degree, to maintain the separation of said magnetizable portions and, when energized below a predetermined degree, to permit relative movement of said magnetizable portions to increase the effectiveness of the first electromagnetic means.

In testimony whereof, I have hereunto subscribed my name this 20th day of June, 1927.

HENRY D. JAMES.